United States Patent
Liou et al.

(10) Patent No.: US 9,883,264 B2
(45) Date of Patent: Jan. 30, 2018

(54) SYSTEMS AND METHODS FOR MULTILAYER PEERING

(71) Applicant: Infinera Corporation, Annapolis Junction, MD (US)

(72) Inventors: Chris Liou, Sunnyvale, CA (US); Abhinava Shivakumar Sadasivarao, Sunnyvale, CA (US); Sharfuddin Syed, Sunnyvale, CA (US); Stu Elby, Sunnyvale, CA (US); Balaji Balasubramanian, Sunnyvale, CA (US); Sri Mohana Satya Srinivas Singamsetty, Annapolis Junction, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/986,442

(22) Filed: Dec. 31, 2015

(65) Prior Publication Data
US 2017/0195757 A1 Jul. 6, 2017

(51) Int. Cl.
*H04B 10/00* (2013.01)
*H04Q 11/00* (2006.01)

(52) U.S. Cl.
CPC . *H04Q 11/0066* (2013.01); *H04Q 2011/0073* (2013.01)

(58) Field of Classification Search
CPC .................. H04Q 11/0066; H04Q 2011/0073
See application file for complete search history.

(56) References Cited

U.S. PATENT DOCUMENTS

| | | | | |
|---|---|---|---|---|
| 5,974,458 A * | 10/1999 | Abe | ........................ | H04L 12/14 370/253 |
| 6,671,256 B1 * | 12/2003 | Xiong | ................. | H04J 14/0227 370/230 |
| 6,697,374 B1 * | 2/2004 | Shraga | .................. | H04J 3/1694 370/458 |
| 7,035,537 B2 * | 4/2006 | Wang | .................. | H04J 14/0227 398/49 |
| 8,699,342 B2 * | 4/2014 | Ishii | ........................ | H04L 45/00 370/235 |
| 2003/0016411 A1 * | 1/2003 | Zhou | .................. | H04Q 11/0062 398/5 |
| 2004/0208544 A1 * | 10/2004 | Ovadia | .............. | H04Q 11/0066 398/47 |
| 2005/0105905 A1 * | 5/2005 | Ovadia | .............. | H04L 12/5695 398/47 |
| 2005/0175183 A1 * | 8/2005 | Ovadia | ............... | H04J 14/0227 380/278 |
| 2015/0373155 A1 * | 12/2015 | Singh | ...................... | H04L 69/08 370/467 |
| 2017/0195757 A1 * | 7/2017 | Liou | .................. | H04Q 11/0066 |

* cited by examiner

*Primary Examiner* — Danny Leung
(74) *Attorney, Agent, or Firm* — David L. Soltz

(57) ABSTRACT

A software defined network, in accordance with some examples of the disclosure, may be used to optimizing traffic across a multi-layer inter-exchange for applications like automated private peering by incorporating packet switching along with OTN and/or optical switching into a converged system. Participants in private peering may have ports into the multi-layer inter-exchange, some to the L2 fabric which supports multi-tenant peering and some to the L1 or L0 fabric for higher-performance private peering.

6 Claims, 3 Drawing Sheets

SYSTEMS AND METHODS FOR MULTILAYER PEERING

FIELD OF DISCLOSURE

This disclosure relates generally to a communication network and more specifically, but not exclusively, to multilayer peering in a communication network.

BACKGROUND

Peering is a voluntary interconnection of separate networks/autonomous systems (AS, that use separate routing tables within their network) for the purpose of exchanging traffic between the users of each network. An agreement by two or more networks to peer is instantiated by a physical interconnection of the networks and an exchange of routing information through the Border Gateway Protocol (BGP) routing protocol (e.g. IETF RFC 4271). Peering involves two networks coming together to exchange traffic with each other freely, and for mutual benefit. This 'mutual benefit' is most often the motivation behind peering, which is often described solely by 'reduced costs for transit services'.

The physical interconnections used for peering are categorized into two types: public peering—interconnection utilizing a multi-party shared switch fabric such as an Ethernet switch; and private peering—interconnection utilizing a point-to-point link between two parties. Public peering is accomplished across a Layer 2 access technology, generally called a shared fabric. These physical interconnections occur at a specific location where each carrier's equipment is co-located with the other carriers. At these locations, multiple carriers interconnect with one or more other carriers across a single physical port. Historically, public peering locations were known as network access points (NAPs); today they are most often called exchange points or Internet exchanges ("IXP"). Many of the largest exchange points in the world can have hundreds of participants, and some span multiple buildings and colocation facilities across a city.

Since public peering allows networks interested in peering to interconnect with many other networks through a single port, it is often considered to offer "less capacity" than private peering, but to a larger number of networks. Many smaller networks, or networks which are just beginning to peer, find that public peering exchange points provide an excellent way to meet and interconnect with other networks which may be open to peering with them. A few exchange points, particularly in the United States, are operated by commercial carrier-neutral third parties, which are critical for achieving cost-effective data center connectivity.

Private peering is the direct interconnection between only two networks, across a Layer 1 or 2 medium that offers dedicated capacity that is not shared by any other parties. Early in the history of the Internet, many private peers occurred across 'telco' provisioned SONET circuits between individual carrier-owned facilities. Today, most private interconnections occur at carrier hotels or carrier neutral colocation facilities, where a direct cross connect can be provisioned between participants within the same building, usually for a much lower cost than telco circuits. Most of the traffic on the Internet, especially traffic between the largest networks, occurs via private peering. However, conventional approaches to both public and private peering require the co-location of each carrier's network equipment.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for establishing a connection between first and second networks, the first and second networks being autonomous from one another and the method including: receiving a request for a connection from a first network to a second network separate from the first network; coupling a first device of the first network to a second device of the second network remote from the first device; sending first network routing information from the first device to the second device; sending second network routing information from the second device to the first device; sending first data from the first device to the second device using the second network routing information in a first format; and sending second data from the second device to the first device using the first network routing information in a second format.

In another aspect, an apparatus including: means for receiving a request for a connection from a first network to a second network separate from the first network; means for coupling a first device of the first network to a second device of the second network remote from the first device; means for sending first network routing information from the first device to the second device; means for sending second network routing information from the second device to the first device; means for sending first data from the first device to the second device using the second network routing information in a first format; and means for sending second data from the second device to the first device using the first network routing information in a second format.

In still another aspect, a non-transient computer readable medium containing program instructions for causing a processor to perform a process including: receiving a request for a connection from a first network to a second network separate from the first network; coupling a first device of the first network to a second device of the second network remote from the first device; sending first network routing information from the first device to the second device; sending second network routing information from the second device to the first device; sending first data from the first device to the second device using the second network routing information in a first format; and sending second data from the second device to the first device using the first network routing information in a second format.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
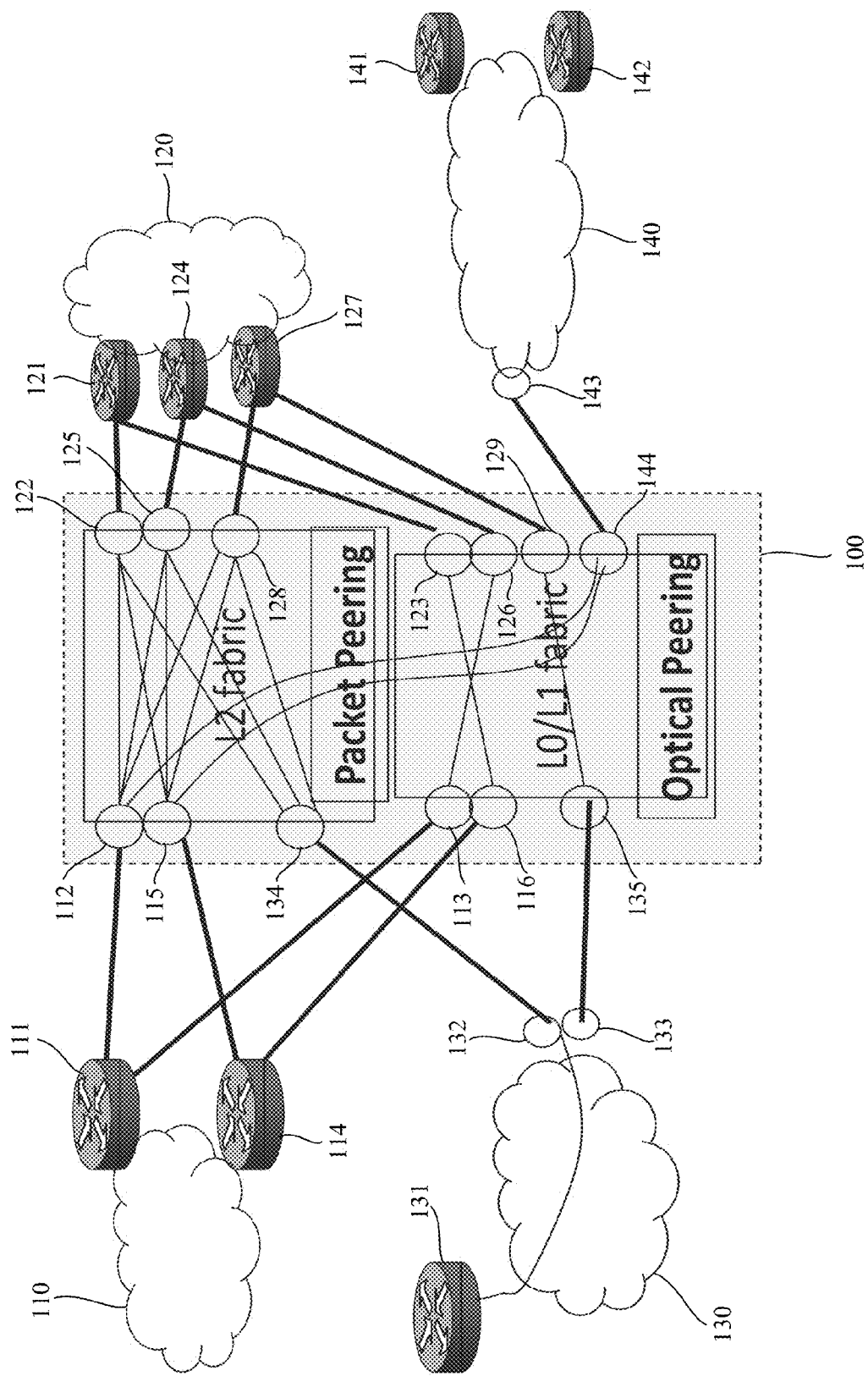
FIG. 1 illustrates an exemplary local and remote peering via a packet and optical system in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. New methods and systems are described herein for distributing the ports and functions of a peering inter-exchange as well as techniques to optimize the traffic distribution between layer 2 packet switching and layer 1 or 0 for optical switching based on a number of variable factors such as traffic volume, service level agreements between network carriers, time based, etc. Unlike conventional inter-exchanges that require a network device from each network to be connected to be located in the same geographic location so that each device can be physically directly connected to the other device, this new and improved systems and methods allow the devices to be remote from each other without a direct fiber connection between them. In addition, the conventional inter-exchanges only allow a layer 2 to layer 2 connection or layer 0/1 to layer 0/1 connection while the improved systems and methods allow a layer 2 to a layer 0/1 connection and dynamically switching between connection types to satisfy service rules or optimize traffic flows.

FIG. 1 illustrates an exemplary local and remote peering via a packet and optical system in accordance with some examples of the disclosure. As shown in FIG. 1, a plurality of independent or autonomous systems (AS) or networks such as a first network 110, a second network 120, a third network 130, and a fourth network 140. While only four networks are shown, it should be understood that more or less may be included depending on the extent of the peering arrangement. Each AS or network 110-140 has its own unique Internet Protocol (IP) addressing and Border Gateway Protocol (BGP) routing. BGP is a standardized exterior gateway protocol designed to exchange routing and reachability information among AS on the Internet. The protocol is often classified as a path vector protocol but is sometimes also classed as a distance-vector routing protocol. The Border Gateway Protocol makes routing decisions based on paths, network policies, or rule-sets configured by a network administrator and is involved in making core routing decisions. BGP may be used for routing within an autonomous system.

BGP neighbors, called peers, are established by manual configuration between routers or switches to create a TCP session on port 179. A BGP speaker sends 19-byte keep-alive messages every 60 seconds to maintain the connection. When BGP runs between two peers in the same autonomous system (AS), it is referred to as Internal BGP (iBGP or Interior Border Gateway Protocol). When it runs between different autonomous systems, it is called External BGP (EBGP or Exterior Border Gateway Protocol). Routers on the boundary of one AS exchanging information with another AS are called border or edge routers or simply eBGP peers and are typically connected directly. Filtering routes learned from peers, their transformation before redistribution to peers or before plumbing them into the routing table is typically controlled via route-maps mechanism. These are basically rules which allow applying certain actions to routes matching certain criteria on either ingress or egress path. These rules can specify that the route is to be dropped or, alternatively, its attributes are to be modified. It is usually the responsibility of the AS administrator to provide the desired route-map configuration on a router supporting BGP.

As shown in FIG. 1, a first network 110 may include a first network device 111 (e.g. a switch or router) with a layer 2 port 112 and a layer 0/1 port 113, and a second network device 114 with a layer 2 port 115 and a layer 0/1 port 116. A second network 120 may include a third network device 121 with a layer 2 port 122 and a layer 0/1 port 123, a fourth network device 124 with a layer 2 port 125 and a layer 0/1 port 126, and a fifth network device 127 with a layer 2 port 128 and a layer 0/1 port 129. A third network 130 may include a sixth network device 131 with a layer 2 port 132 and a layer 0/1 port 133 that are connected to another device (e.g. border gateway, switch, router, etc.) not shown that includes an associated layer 2 port 134 and an associated layer 0/1 port 135. The associated ports 134 and 135 may be located in another device that is part of the third network 130 or the sixth network device 131. A fourth network 140 may include a seventh network device 141 and an eighth network device 142 with an packet optical transport network port 143 (e.g. a P-OTN device) that includes converged layer 0/1/2/3 switching and routing along with an associated layer 0/1 port 144. As shown, for example, a peering may be set up between the first network 110 (content provider) and the fourth network 140 (access network provider). In this example, a data flow may start as L2 packet flow from the first network device 111 to the L2 port 112 and then converted to the L0/1 port 144, and from the L0/1 port 144 as an optical signal (e.g. a L2 packet encapsulated in a L0/1 OTN wrapper) to the fourth network 140. The conversion from a L2 packet switched by an L2 switch fabric to an OTN signal switched by a L0/1 fabric may take place in the first network device 111 or any network device along the path from device 111 to a recipient within the fourth network 140.

By implementing a software defined network (SDN) approach in combination with peering connections, a distributed a multi-layer inter-exchange (MLIX) 100 may be created that allows for optimization of applications like automated private peering. This allows the MLIX 100 to incorporate packet switching along with OTN and/or optical switching into a converged system. Thus, participants in private peering will have ports into the MLIX 100, some to the L2 fabric which supports multi-tenant peering, some to the L1 or L0 fabric for higher-performance private peering. While FIG. 1 is drawn to simulate a single device, the MLIX 100 may be composed of ports from various network devices in each of the participating peering networks or AS. Thus, the network is effectively used as a switch fabric instead of the internal switch fabric of a single network element, such as an L3 router. This will allow multiple different ways to interconnect a content provider (AS peering participant) router to the L2/L1/L0 fabric of multiple devices (or a single device). For example, L2 to L1 to L0 or L2 direct to L0 without wasting OTN switching bandwidth. This configuration also allows separate L1 and L0 fabrics to be used. In addition, it is no longer necessary for co-location of an L3 router (e.g. BGP router server) at the internet exchange site for multilateral interconnections. Multilateral interconnection is a method of exchanging routing information between three or more exterior BGP speakers using a single intermediate broker system, referred to as a route server. Route servers are typically used on shared access media networks, such as Internet exchange points (IXPs), to facilitate simplified interconnection between multiple Internet routers. Instead, an expensive L3 router can be situated at a remote site and the router may have an OTN or other cheaper interconnect to the IX site.

Figure 2:
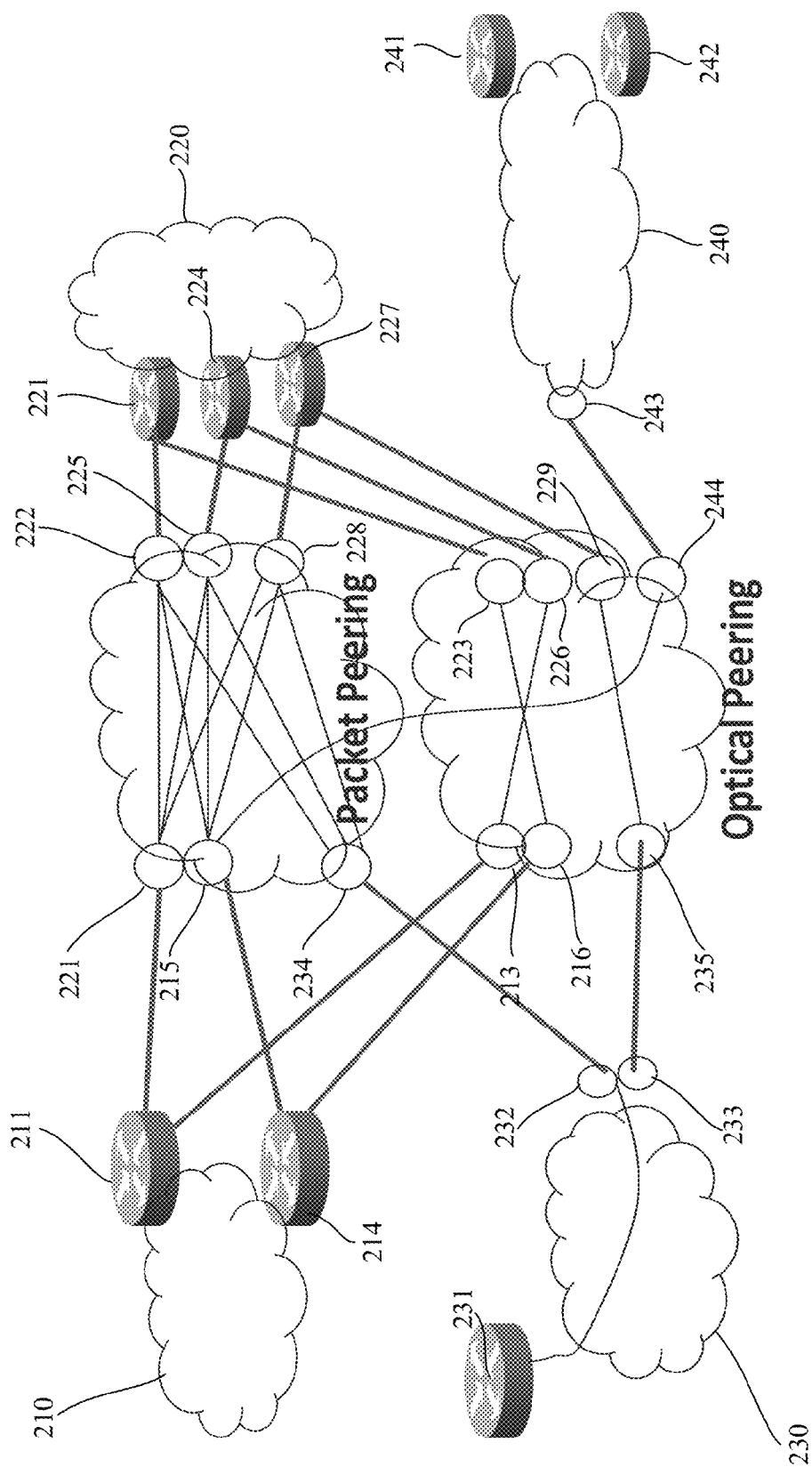
FIG. 2 illustrates an exemplary local and remote peering via a packet and optical network fabrics in accordance with some examples of the disclosure.

FIG. 2 illustrates an exemplary local and remote peering via a packet and optical network fabrics in accordance with some examples of the disclosure. This may allow leveraging of SDN-based intelligence and analytics to assess current traffic flow through an MLIX and balance traffic across the MLIX for optimum performance. For example, algorithms in a SDN MLIX Optimizer may determine which large flows to offload from the L2 peering fabric to the L1/L0 fabric, based on flow size, duration, variance, source and/or destination, and other attributes including economic policies between peering participants. It may also allow leveraging SDN control over traffic source and MLIX participants interconnected to the MLIX as well as the MLIX through control over the packet fabric, creating virtual switches that each AS can control, and using a route server within the MLIX controller for BGP session management.

As shown in FIG. 2, a first network 210 may include a first network device 211 (e.g. a switch or router) with a layer 2 port 212 and a layer 0/1 port 213, and a second network device 214 with a layer 2 port 215 and a layer 0/1 port 216. A second network 220 may include a third network device 221 with a layer 2 port 222 and a layer 0/1 port 223, a fourth network device 224 with a layer 2 port 225 and a layer 0/1 port 226, and a fifth network device 227 with a layer 2 port 228 and a layer 0/1 port 229. A third network 230 may include a sixth network device 231 with a layer 2 port 232 and a layer 0/1 port 233 that are connected to another device (e.g. border gateway, switch, router, etc.) not shown that includes an associated layer 2 port 234 and an associated layer 0/1 port 235. The associated ports 234 and 235 may be located in another device that is part of the third network 230 or the sixth network device 231. A fourth network 240 may include a seventh network device 241 and an eighth network device 242 with an packet optical transport network port 243 (e.g. a P-OTN device) that includes converged layer 0/1/2/3 switching and routing along with an associated layer 0/1 port 244. As shown, for example, a peering may be set up between the first network 210 (content provider) and the fourth network 240 (access network provider). In this example, a data flow may start as L2 packet flow from the fourth network device 214 to the L2 port 215 and then converted to the L0/1 port 244, and from the L0/1 port 244 as an optical signal (e.g. a L2 packet encapsulated in a L0/1 OTN wrapper) to the fourth network 240. The conversion from a L2 packet switched by an L2 switch fabric to an OTN signal switched by a L0/1 fabric may take place in the fourth network device 214 or any network device along the path from device 214 to a recipient within the fourth network 240.

Figure 3:
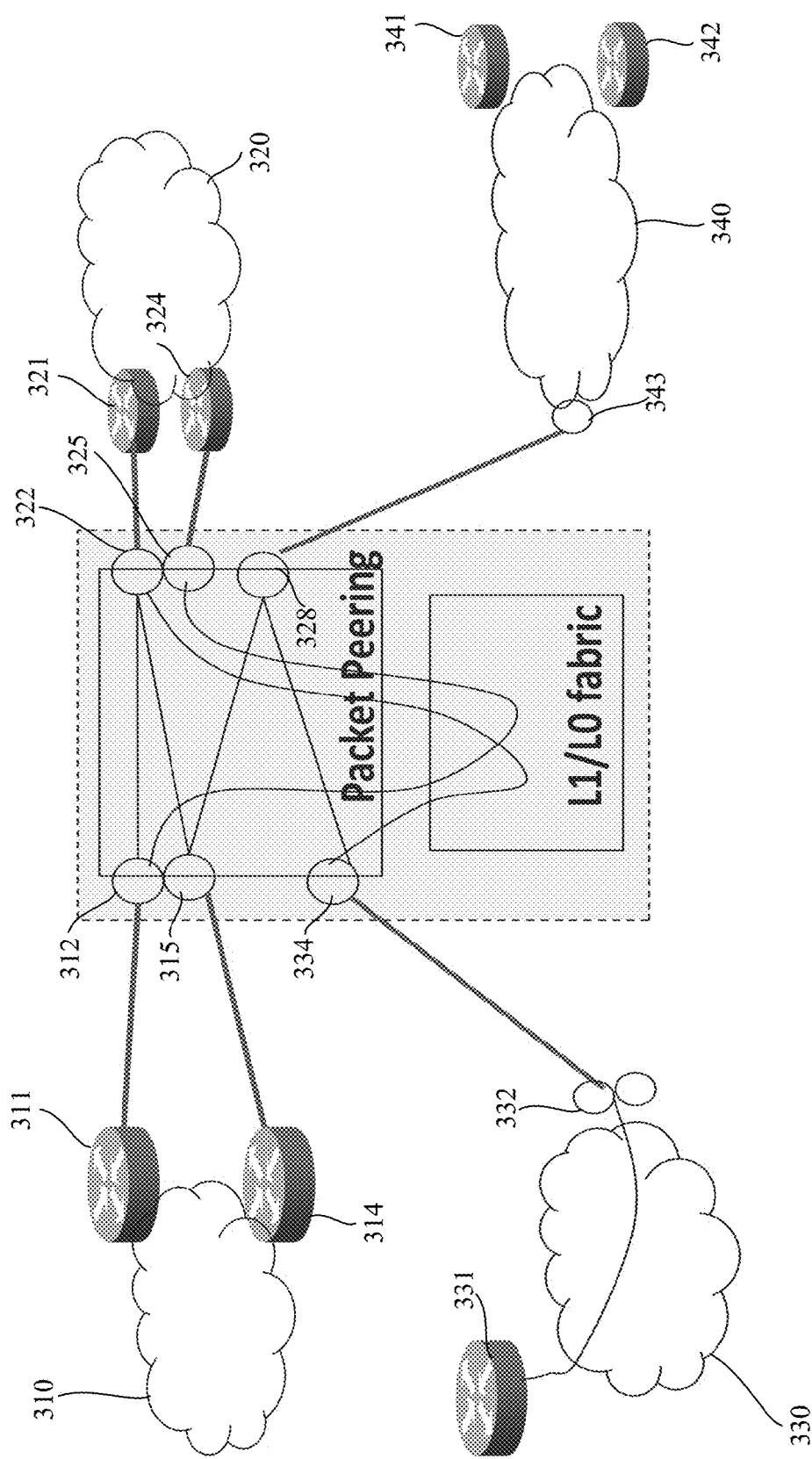
FIG. 3 illustrates an exemplary local and remote peering via a single interface in accordance with some examples of the disclosure.

FIG. 3 illustrates an exemplary local and remote peering via a single interface in accordance with some examples of the disclosure. Optimizing the traffic flow is accomplished in various ways. By analyzing flows between a source and MLIX participants, a SDN MLIX Optimizer can dynamically steer flows to transit the appropriate layer of the MLIX. For transit of peering traffic across circuit-switched access networks (e.g. remote peering), packet traffic may be encapsulated over OTN into the access network. Different attributes and parameters may be considered for optimization of traffic through an MLIX—(1) load balancing traffic across an MLIX (centralized or distributed); (2) metrics other than destination address/prefix/AS path to perform optimization and may include other L4-L7 attributes (application-aware traffic routing within MLIX); (3) cost optimization between different network layers based on flow sizes, time-of-day, cost of transit, maximum fit of traffic for maximum traffic/revenue generation, or other heuristics; (4) design for failure resiliency (e.g., single point of failure within MLIX); (5) latency; (6) other Traffic Engineering (TE) parameters; and (7) traffic routing through an MLIX based on the visibility of bandwidth utilization, oversubscription, burst size, and other potential policies.

As shown in FIG. 3, a first network 310 may include a first network device 311 (e.g. a switch or router) with a layer 2 port 312, and a second network device 314 with a layer 2 port 315. A second network 320 may include a third network device 321 with a layer 2 port 322, a fourth network device 324 with a layer 2 port 325. A third network 330 may include a sixth network device 331 with a layer 2 port 332 that are connected to another device (e.g. border gateway, switch, router, etc.) not shown that includes an associated layer 2 port 334. The associated port 334 may be located in another device that is part of the third network 330 or the sixth network device 331. A fourth network 340 may include a seventh network device 341 and an eighth network device 342 with an packet optical transport network port 343 (e.g. a P-OTN device) that includes converged layer 0/1/2/3 switching and routing along with an associated layer 2 port 328. As shown, for example, a peering may be set up between the first network 310 (content provider) and the second network 320 (access network provider). In this example, a data flow may start as L2 packet flow from the first network device 311 to the L2 port 212 and then converted to a L0/1 data flow temporarily then back to a packet flow before the L2 port 322, and from the L2 port 322 as a packet signal (e.g. a L2 packet) to the second network 220. The conversion from a L2 packet switched by an L2 switch fabric to an OTN signal switched by a L0/1 fabric may take place in the first network device 311 or any network device along the path from device 311 to the recipient the third device 321 within the second network 220.

Examples of devices that may use the methods and systems described herein may include routers or switches, such as Infinera's DTN-X platform, that may have multiple functionalities like L0 wavelength division multiplexing (WDM) transport capabilities, L1 digital OTN switching capabilities, and L2 packet switching capabilities. The network may be optimized by enabling the packet switching feature in network devices using protocols such as MPLS-TP and switching LSP's, and packet switching in the network core can be performed by the devices.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for establishing a connection between first and second networks, the first and second networks being autonomous from one another; the method comprising:
    receiving a request for a connection from the first network to the second network separate from the first network;
    coupling a first device of the first network to a second device of the second network remote from the first device;
    sending first network routing information from the first device to the second device;
    sending second network routing information from the second device to the first device;
    sending first data from the first device to the second device using the second network routing information in a first format, the first format being layer 2 format;
    converting the first data from the first format to a second format, the second format being a layer 0 or a layer 1 format; and
    sending second data from the second device to the first device using the first network routing information in a second format.

2. The method of claim 1, further comprising:
    receiving the first data at the second device in the second format.

3. The method of claim 1, further comprising:
    converting the second data from the second format to the first format; and
    receiving the second data at the first device in the first format.

4. The method of claim 1, further comprising:
    converting the first data from the first format to the second format;
    transmitting the first data in the second format;
    converting the first data from the second format to the first format; and
    receiving the first data at the second device in the first format.

5. A method for establishing a peering connection between first and second networks, the first and second networks being autonomous from one another; the method comprising:
    connecting the first network to a first device;
    connecting the second network to the first device;
    receiving first network routing information at the first device;
    receiving second network routing information at the first device;
    receiving first data from the first network at the first device, the first data being in a layer 2 format;
    converting the first data from the layer 2 format to a layer 1 format or a layer 0 format; and
    sending the first data to the second network in the layer 1 format or the layer 0 format using the second network routing information.

6. The method of claim 5, wherein the first device is one of an Ethernet switch or a first router and a second router, the first router configured to route the first data using the first network routing information and the second router configured to route the first data using the second network routing information.

* * * * *